US012791410B2

(12) United States Patent
Hultén et al.

(10) Patent No.: US 12,791,410 B2
(45) Date of Patent: Nov. 10, 2026

(54) INDUCTIVE TORSION BAR TORQUE SENSOR

(71) Applicant: Sentient AB, Gothenburg (SE)

(72) Inventors: Johan Hultén, Gothenburg (SE); Jochen Pohl, Partille (SE)

(73) Assignee: SENTIENT AB, Gothenburg (SE)

( * ) Notice: Subject to any disclaimer, the term of this patent is extended or adjusted under 35 U.S.C. 154(b) by 203 days.

(21) Appl. No.: 18/852,575

(22) PCT Filed: May 10, 2023

(86) PCT No.: PCT/SE2023/050455
§ 371 (c)(1),
(2) Date: Sep. 30, 2024

(87) PCT Pub. No.: WO2023/234821
PCT Pub. Date: Dec. 7, 2023

(65) Prior Publication Data

US 2025/0093220 A1 Mar. 20, 2025

(30) Foreign Application Priority Data

Jun. 3, 2022 (SE) .................................... 2250676-0

(51) Int. Cl.
*G01L 3/10* (2006.01)
*G01L 5/22* (2006.01)
*B62D 6/10* (2006.01)

(52) U.S. Cl.
CPC .............. *G01L 3/105* (2013.01); *G01L 5/221* (2013.01); *B62D 6/10* (2013.01)

(58) Field of Classification Search
None
See application file for complete search history.

(56) References Cited

U.S. PATENT DOCUMENTS 2,553,940 A 5/1951 Quartullo
2,820,872 A 1/1958 Carr
(Continued)

FOREIGN PATENT DOCUMENTS

AR 50759 A1 11/2006
CN 1491170 A 4/2004
(Continued)

OTHER PUBLICATIONS

Office Action issued in corresponding Chinese Patent Application No. 201980058242.7, Aug. 29, 2023, pp. 1-7.
(Continued)

*Primary Examiner* — Stephen D Meier
*Assistant Examiner* — Ruben C Parco, Jr.
(74) *Attorney, Agent, or Firm* — Jeffrey S. Melcher; Melcher Patent Law PLLC

(57) ABSTRACT

The invention relates to an inductive torsion bar torque sensor (100), comprising at least a first and a second stator arrangement (10,10A) with each a receiving structure (11, 11A) comprising a periodically repeated structure having a first and a second period, a first and a second rotor (20,20 A) rotatably arranged with respect to the first and second stator arrangements (10,10 A) forming two inductive position sensors (1,11A) for measuring an angle at each end of a torsion bar (5) and generate respective signals, at least one excitation or transmitter coil (40) and an oscillator circuit for generating a periodic alternating voltage and coupling it into the excitation coil(s) (40). The periodicity of the first receiving structure (11) is different from the periodicity of the second receiving structure (11A), the first and second receiving structures (11,11A) comprising a first and a second coil structure (101,101;102,102), the first rotatable rotor (20) serving the purpose of influencing the strength of an inductive coupling between the excitation coil(s) (40) and the first
(Continued)

receiving structure (11), the second rotatable rotor (20A) serving the purpose of influencing the strength of an inductive coupling between the/an excitation coil(s) (40) and the second receiving structure (11A). The signals generated by the first and second pair of receiving structures (11,11A) and rotors (20,20A) are orthogonal.

20 Claims, 3 Drawing Sheets

(56) References Cited

U.S. PATENT DOCUMENTS

| | | | | |
|---|---|---|---|---|
| 4,441,572 | A | 4/1984 | Ito | |
| 4,624,336 | A | 11/1986 | Eddy | |
| 5,307,892 | A | 5/1994 | Phillips | |
| 5,388,658 | A | 2/1995 | Ando | |
| 5,406,155 | A | 4/1995 | Persson | |
| 5,596,252 | A | 1/1997 | Shimizu | |
| 5,925,082 | A | 7/1999 | Shimizu | |
| 6,219,604 | B1 | 4/2001 | Dilger | |
| 6,282,478 | B1 | 8/2001 | Akita | |
| 6,384,598 | B1 * | 5/2002 | Hobein | G01D 5/2046 318/660 |
| 6,546,322 | B2 | 4/2003 | Williams | |
| 6,640,173 | B1 | 10/2003 | Zheng | |
| 6,691,009 | B1 | 2/2004 | Yao | |
| 6,694,239 | B1 | 2/2004 | Yao | |
| 6,718,243 | B1 | 4/2004 | Yao | |
| 6,757,601 | B1 | 6/2004 | Yao | |
| 6,799,104 | B2 | 9/2004 | Yao | |
| 6,895,318 | B1 | 5/2005 | Barton | |
| 7,165,644 | B2 | 1/2007 | Offerle | |
| 8,073,608 | B2 | 12/2011 | Hulten | |
| 8,453,518 | B2 | 6/2013 | Diekmann et al. | |
| 8,567,554 | B2 | 10/2013 | Zaloga | |
| 8,694,209 | B2 | 4/2014 | Tokimasa | |
| 8,751,111 | B2 | 6/2014 | Wilson-Jones | |
| 9,180,907 | B2 | 11/2015 | Deimel | |
| 9,260,092 | B1 | 2/2016 | Lombroz | |
| 9,421,883 | B2 | 8/2016 | Drako | |
| 10,005,455 | B2 | 6/2018 | Hulten | |
| 10,351,162 | B1 | 7/2019 | Katzourakis | |
| 11,214,302 | B2 | 1/2022 | Weiefors | |
| 2002/0019690 | A1 | 2/2002 | Masahiko | |
| 2003/0014168 | A1 | 1/2003 | Williams | |
| 2003/0220727 | A1 | 11/2003 | Husain | |
| 2004/0016294 | A1 | 1/2004 | Sugitani | |
| 2004/0019417 | A1 | 1/2004 | Yasui | |
| 2004/0107032 | A1 | 6/2004 | Farrelly | |
| 2004/0138796 | A1 | 7/2004 | Yao | |
| 2004/0186641 | A1 | 9/2004 | Hironaka | |
| 2004/0251061 | A1 | 12/2004 | Augustine | |
| 2005/0189161 | A1 | 9/2005 | Zheng et al. | |
| 2005/0189163 | A1 | 9/2005 | Barton | |
| 2005/0209751 | A1 | 9/2005 | Kato | |
| 2005/0234622 | A1 | 10/2005 | Pillar | |
| 2005/0246101 | A1 | 11/2005 | Courtenay | |
| 2006/0080016 | A1 | 4/2006 | Kasahara | |
| 2006/0289226 | A1 | 12/2006 | Sugitani | |
| 2007/0021889 | A1 | 1/2007 | Tsuchiya | |
| 2007/0144824 | A1 | 6/2007 | Tamaki | |
| 2007/0192005 | A1 | 8/2007 | Ishikawa | |
| 2007/0199764 | A1 | 8/2007 | Kifuku | |
| 2007/0256885 | A1 | 11/2007 | Ammon | |
| 2007/0299580 | A1 | 12/2007 | Lin | |
| 2008/0021613 | A1 | 1/2008 | Hamaguchi | |
| 2008/0040002 | A1 | 2/2008 | Galkoswki | |
| 2008/0066994 | A1 | 3/2008 | Fujita | |
| 2008/0109134 | A1 | 5/2008 | Bolourchi | |
| 2008/0164087 | A1 | 7/2008 | Koyama | |
| 2008/0243340 | A1 | 10/2008 | Hung | |
| 2009/0271070 | A1 | 10/2009 | Feller | |
| 2009/0271074 | A1 | 10/2009 | Hulten | |
| 2009/0299573 | A1 | 12/2009 | Thrun | |
| 2009/0312909 | A1 | 12/2009 | Onuma | |
| 2010/0072738 | A1 | 3/2010 | Szabela | |
| 2010/0168964 | A1 | 7/2010 | Higashi | |
| 2011/0010054 | A1 | 1/2011 | Wilson-Jones | |
| 2011/0272204 | A1 | 11/2011 | Nell | |
| 2012/0109464 | A1 | 5/2012 | Mizutani | |
| 2012/0199414 | A1 | 8/2012 | Shimizu | |
| 2013/0032430 | A1 | 2/2013 | Zaloga | |
| 2013/0231830 | A1 | 9/2013 | Van Dan Elzen | |
| 2014/0157922 | A1 | 6/2014 | Schneider | |
| 2014/0238770 | A1 | 8/2014 | Namikawa | |
| 2014/0291061 | A1 | 10/2014 | Deimel | |
| 2015/0158528 | A1 | 6/2015 | Moshchuk | |
| 2015/0175197 | A1 | 6/2015 | Heilig | |
| 2015/0246687 | A1 | 9/2015 | Takeda | |
| 2015/0251541 | A1 | 9/2015 | Drako | |
| 2015/0259007 | A1 | 9/2015 | Di Cairano | |
| 2015/0329141 | A1 | 11/2015 | Preijert | |
| 2016/0090005 | A1 | 3/2016 | Drako | |
| 2016/0159390 | A1 | 6/2016 | Tamaizumi | |
| 2016/0272197 | A1 | 9/2016 | Hulten | |
| 2017/0017734 | A1 | 1/2017 | Groh | |
| 2017/0066476 | A1 | 3/2017 | Yoshio | |
| 2017/0113714 | A1 | 4/2017 | Guerra | |
| 2017/0247032 | A1 | 8/2017 | Lee | |
| 2018/0086374 | A1 | 3/2018 | Subaru | |
| 2018/0105181 | A1 | 4/2018 | Skold | |
| 2018/0127025 | A1 | 5/2018 | Wijffels | |
| 2018/0141588 | A1 | 5/2018 | Shimizu | |
| 2018/0188705 | A1 | 7/2018 | Linger | |
| 2018/0281844 | A1 | 10/2018 | Wijffels | |
| 2018/0281845 | A1 | 10/2018 | Wijffels | |
| 2018/0319422 | A1 | 11/2018 | Thyssenkrupp | |
| 2019/0270482 | A1 | 9/2019 | Nakakuki | |
| 2020/0108816 | A1 | 4/2020 | Velazquez alcantar | |
| 2020/0361522 | A1 | 11/2020 | Weimin | |
| 2021/0129839 | A1 | 5/2021 | Hulten | |
| 2021/0284230 | A1 | 9/2021 | Volkswagen | |
| 2021/0389196 | A1 | 12/2021 | Kyocera | |

FOREIGN PATENT DOCUMENTS

| | | | | |
|---|---|---|---|---|
| CN | 1867477 | A | 11/2006 | |
| CN | 101119884 | A1 | 2/2008 | |
| CN | 101450677 | B | 6/2009 | |
| CN | 101657345 | A | 2/2010 | |
| CN | 102114867 | A | 7/2011 | |
| CN | 102470864 | A | 5/2012 | |
| CN | 102612456 | A | 7/2012 | |
| CN | 103303361 | B | 9/2013 | |
| CN | 103895693 | A | 7/2014 | |
| CN | 105644621 | A | 6/2016 | |
| CN | 106494497 | A | 3/2017 | |
| CN | 107380255 | A | 11/2017 | |
| CN | 107531279 | A | 1/2018 | |
| CN | 107792169 | A | 3/2018 | |
| CN | 109153405 | A | 1/2019 | |
| CN | 109415058 | A | 3/2019 | |
| CN | 111108035 | B | 5/2020 | |
| CN | 111315640 | B | 6/2020 | |
| CN | 112074449 | B | 11/2020 | |
| CN | 113365900 | A | 9/2021 | |
| CN | 114502448 | A | 5/2022 | |
| CN | 118695984 | A | 9/2024 | |
| CN | 118871342 | A | 10/2024 | |
| DE | 19539101 | A | 2/1997 | |
| DE | 19912169 | A1 | 7/2000 | |
| DE | 19941464 | | 3/2001 | |
| DE | 19941464 | A1 | 3/2001 | |
| DE | 202011003716 | | 8/2012 | |
| DE | 102017203456 | | 9/2018 | |
| EP | 1081454 | A1 * | 3/2001 | G01D 5/2046 |
| EP | 1193160 | A2 | 4/2002 | |
| EP | 1228941 | A2 | 8/2002 | |
| EP | 1577194 | A1 | 9/2005 | |
| EP | 1698540 | A1 | 9/2006 | |
| EP | 2070 804 | A1 | 6/2009 | |
| EP | 2070804 | | 6/2009 | |
| EP | 1867542 | B1 | 7/2009 | |

(56) References Cited

FOREIGN PATENT DOCUMENTS

| | | | |
|---|---|---|---|
| EP | 3411280 | A1 | 12/2018 |
| EP | 3684675 | B1 | 7/2020 |
| EP | 3684676 | B1 | 7/2020 |
| EP | 3768575 | A1 | 1/2021 |
| EP | 3847077 | A1 | 7/2021 |
| EP | 3887225 | A1 | 10/2021 |
| EP | 4041616 | A1 | 8/2022 |
| ES | 2772749 | T3 | 7/2020 |
| FR | 2922848 | A1 | 5/2009 |
| JP | 3178866 | A | 8/1991 |
| JP | 2010047193 | | 3/2010 |
| SE | 1751179 | C2 | 9/2017 |
| SE | 1850315 | A1 | 3/2018 |
| SE | 1951159-1 | | 10/2019 |
| SE | 543719 | C2 | 6/2021 |
| SE | 544124 | C2 | 1/2022 |
| SE | 544243 | C2 | 3/2022 |
| SE | 2250335 | A | 3/2022 |
| SE | 2250146 | A1 | 8/2023 |
| SE | 2250676 | A1 | 12/2023 |
| WO | 111997 | A1 | 2/2001 |
| WO | 135884 | A1 | 5/2001 |
| WO | 02/22397 | A1 | 3/2002 |
| WO | 2009/095442 | | 6/2002 |
| WO | 2009/095442 | A1 | 6/2002 |
| WO | 2003006300 | A2 | 1/2003 |
| WO | 2006005730 | A1 | 1/2006 |
| WO | 2010144049 | A1 | 6/2010 |
| WO | 2012043683 | A1 | 4/2012 |
| WO | 2017135884 | | 8/2017 |
| WO | 2017135884 | A1 | 8/2017 |
| WO | 2017184064 | | 10/2017 |
| WO | 2019059838 | | 3/2018 |
| WO | 2019182496 | | 9/2018 |
| WO | 2019059829 | | 3/2019 |
| WO | 2020050759 | | 3/2020 |
| WO | 2021076025 | | 4/2021 |
| WO | 2021/250510 | | 12/2021 |
| WO | 2023177337 | | 9/2023 |
| WO | 2024019647 | | 1/2024 |

OTHER PUBLICATIONS

International Search Report issued in parent PCT/SE2019/050754, Nov. 29, 2019, pp. 1-2.

Written Opinion issued in parent PCT/SE2019/050754, Nov. 29, 2019, pp. 1-8.

International Search Report issued in parent PCT/SE2019/051097, Nov. 3, 2020, pp. 1-2.

Written Opinion issued in parent PCT/SE2019/051097, Nov. 3, 2020, pp. 1-6.

Search Report issued in corresponding Chinese Patent Application No. 201980078956.4, Jul. 19, 2023, pp. 1-3.

Office Action issued in corresponding Chinese Patent Application No. 201980078956.4, Jul. 19, 2023, pp. 1-5.

Effect of Wheel Geometry Parameters on Vehicle Steering, Rajvardhan et al.(Year: 2011).

Variable Caster Steering, IEEE, Alberding et al.(Year: 2014).

International Search Report issued in parent PCT/SE2020/050876, Nov. 3, 2020, pp. 1-3.

Written Opinion issued in parent PCT/SE2020/050876, Nov. 3, 2020, pp. 1-10.

RP Rajvardhan et al: Effect of Wheel Geometry Parameters On Vehicle Steering of Gravity CRC Constant Radius Cornering DOF Degrees of Freedom KPIA Kingpin Inclination Angle SAi Steering Axis Inclination SLC Single Lane Change, Sep. 30, 2010 (Sep. 30, 2010), pp. 11-18, XP055086764, Retrieved from the Internet: URL:http://www.msrsas.org/docs/sastech_jou rnals/archives/Sept2010/2.pdf[retrieved on Nov. 5, 2013).

Andrew S Ansara et al:Optimization of Front Suspension and Steering Parameters of an Off-road Car using Adams/Car Simulation, Sep. 30, 2017 (Sep. 30, 2017), XP055759859, Retrieved from the Internet: URL:https://lwww.ijert_Org/research/optimiz ation--of-front-suspension-and-steering-parameters--of-an-off-road-car-using-adamscar-Simulation-IJERTV61S090055.pdf [retrieved on Dec. 14, 2020).

Emanuele Bon Era et al: On the Influence of Suspension Geometry on Steering Feedback 11 , Applied Sciences, vol. 10, No. 12, Jun. 1, 2020 (Jun. 1, 2020), p. 4297, XP055759045, CH ISSN: 2076-3417, DOI: 10.3390/app10124297.

International Search Report issued in parent PCT/SE2023/050003, May 4, 2023, pp. 1-2.

Written Opinion issued in parent PCT/SE2023/050003, May 4, 2023, pp. 1-10.

International Search Report issued in parent PCT/SE2023/050157, Jul. 7, 2023, pp. 1-2.

Written Opinion issued in parent CT/SE2023/050157, Jul. 7, 2023, pp. 1-18.

International Search Report issued in parent PCT/SE2023/050455, Jul. 8, 2023, pp. 1-2.

Written Opinion issued in parent PCT/SE2023/050455, Jul. 8, 2023, pp. 1-11.

Search Report issued in corresponding Chinese patent application Serial No. 201780009900.4 on Mar. 16, 2020, pp. 1-3.

Office Action issued in corresponding Chinese patent application Serial No. 201780009900.4 on Mar. 20, 2020, pp. 1-10.

Decision to Grant in corresponding European Patent Application No. 17705188.5-1013, mailed Oct. 17, 2019, p. 1.

EPO, Int'l Search Report and Written Opinion in PCT/2017/050100, Apr. 20, 2017.

Decision to Grant in corresponding European Patent Application No. 17718757.2 mailed Apr. 5, 2020, pp. 1-2.

Office Action issued in corresponding Chinese Patent Application No. 201780024423.9, Jun. 16, 2020, pp. 1-8, with translation pp. 1-3.

EPO, Int'l Search Report in PCT/2017/050382, Jul. 17, 2017.

EPO, Written Opinion in PCT/2017/050382, Jul. 17, 2017.

International Search Report issued in parent PCT/SE2018/050920, Feb. 18, 2019, pp. 1-3.

Written Opinion issued in parent PCT/SE2018/050920, Feb. 18, 2019, pp. 1-7.

International Search Report issued in parent PCT/SE2018/050966, Jan. 24, 2019, pp. 1-3.

Written Opinion issued in parent PCT/SE2018/050966, Jan. 24, 2019, pp. 1-7.

W0-2012043683-A 1 translation (Year: 2012).

CN-109415058-A (Year: 2019).

International Search Report issued in parent PCT/SE2019/050237, Jun. 13, 2019, pp. 1-8.

Written Opinion issued in parent PCT/SE2019/050237, Jun. 13, 2019, pp. 1-3.

EP-1867542-B1 translation (Year: 2009).

Swedish Search Report for Application 1951159-1, Mailed on Jun. 10, 2020.

* cited by examiner

INDUCTIVE TORSION BAR TORQUE SENSOR

TECHNICAL FIELD

The present invention relates to an inductive torsion bar torque sensor having the features of the first part of claim 1.

BACKGROUND

For power assisted steering of motor driven vehicles the requirements on controlling the assistance are high. The steering assistance control is needed for allowing calculation of the steering assistance based on, among other things, the steering torque in the steering column. For sensing the steering torque, it is known to use a steering-torque sensor, or a torsion bar torque sensor. Since the steering assistance control is safety critical, the sensed torque values must be very accurate. The steering control concept also must be robust to disturbances from electric and magnetic fields, meaning that the sensor must be robust to any such disturbances. It is also an indispensable requirement that the sensor has a long life time and is fail safe.

In order to provide a sensor with a long life time, contactless sensors have been used. In order to provide sensor resistance to electromagnetic fields generated by the electric motor control it has been a problem to avoid interference.

Sensors for measuring the absolute angle positions of two steering column sections relative to the vehicle for determining the torque from a calculation of the difference between the absolute angle positions are known. The inductive position sensing's are based on at least one excitation coil, at least one oscillator circuit which is connected to the excitation coil and which generates a periodic alternating voltage and couples it into the excitation coil during operation, at least two stators, which each have a number of periodically repeated receiver structures, at least two rotors which can be rotated relative to the stator and which influence the strength of the inductive coupling between the excitation coil and the receiver means and an evaluation means suitable for the evaluation of the signals induced in the receiver means.

torque sensing principle is based on two position sensors, there is a risk that one of the sensors detects the other rotor position also (so called over-hearing), and not only the one that should be detected. This is especially noticeable when there is a torsion bar torque so that the two rotors are changing their relative position owing to the twist of the torsion bar.

DE 19941464 discloses an inductive angle sensor comprising two receiver coils arranged in one plane and two rotors arranged on one another wherein the angle periodicities are different, and the ratio between the angle periodicities is a non-integer.

In WO2009/095442 (U.S. Pat. No. 8,453,518) it was found that the method disclosed in DE 19941464 with inductive angle sensor comprising two receiver coils arranged in one plane was not satisfactory since the measurements of the angles were not accurate enough and not reliable since the receiver coils affected one another, which was a source of error in the determination of the angle difference and the results of the measurements often involving large errors.

Therefore, in WO2009/095442, a sensor principle for solving the problem of over-hearing was proposed which comprises a combination of two inductive position sensors, measuring an angle at each end of a torsion bar, the angle difference times the stiffness of the torsion bar being the torsion-bar torque, wherein a different number of rotor and receiver structures on the different sides, such that a number N of said receiver structures of said first receiver and a number M of said receiver structures of said second receiver are in an integer ratio, greater than one, relative to one another meaning that $$\frac{\max(M, N)}{\min(M, N)} = \text{integer} > 1$$

However, through the solution discussed in WO2009/095442 the problem with over-hearing is still not solved to a satisfactory extent and the sensor is prone to over-hearing. It rather seems that the ratio condition is just a result of exhaustive testing of arbitrary solutions since it is stated that: "It has been detected, that, surprisingly, the measuring errors in the angle measurement differences can be reduced due to the integral ratio of the number N of the receiver structures of the first the number M of the receiver structures of the second receiver means (the numbers of the receiver structures of the two receiver means must not be identical, however)". In addition, there are considerable fabrication restrictions associated with a sensor as described in WO2009/095442 since the quotient between the numbers of receiver structures must be an integer number larger than 1, i.e. a difference of at least a factor two.

WO20211250510A1 shows a torque sensor with an oscillator circuit generating a periodic voltage signal and coupling it into a at least one excitation coil, a first channel with a first receiver with periodically repeated receiver structures and a first rotor target, a second channel with a second receiver with periodically repeated receiver structures and a second rotor target. To reduce interference among channels and one or more features to reduce the electromagnetic coupling between the first and second channel. The number of first receiver structures M is determined based on the number of second receiver structures N such that, in some embodiments, M=2N+/−1, and in some embodiments M=2N. To reduce electromagnetic coupling of the first channel and the second channel, rotor targets composed of different types of materials are used or different ratios of receiver periods relative to rotor targets are used creating a time varying field in a rotor target. In some embodiments in which both channels of the torque sensor include rotor targets and receivers having the same configuration, the number of first receiver structures M is determined based on the number of second receiver structures N such that M=2N+/−1, and the angular width of each target lobe of the first rotor target of a first channel is adjusted to be approximately equal to an angular width corresponding to a single period of the plurality of second receiver structures of the second receiver of a second channel. FIG. 6 e.g. shows a first rotor target 212 which is configured to be orthogonal to the second rotor target 214, i.e. the two rotors are geometrically positioned so that they are located on a small portion on the circumference only and angled in different directions.

However, using a number of first receiver structures M=2N corresponds to the teaching of WO2009/095442 discussed above, and the torque sensor will suffers from the same disadvantages, and, also if using a number of first receiver structures M=2N±1 the torque sensor suffer from a sub-optimal resolution and noise on both angle sensors as if the optimal design has N periods, then it is obvious that a design with M=2N±1 is not optimal (given that N is greater than 1—otherwise any reduction of electromagnetic coupling at all). Also, the design freedom is limited since the number of usable receiver structures is limited.

SUMMARY

It is therefore an object of the present invention to provide an improved inductive torque sensor through which one or more of the above-mentioned problems can be solved and through which one or more of the shortcomings can be overcome.

Particularly it is an object to provide an inductive torque sensor through which the two inductive position sensing's are substantially not subjected to over-hearing.

It is also an object to provide an inductive torque sensor which delivers very accurate sensed torque values, and in particular is for measuring steering torque values for an automotive steering assistance control.

Furthermore, it is an object to provide an improved torque sensor with an increased resolution as well as a reduced noise reduction.

Particularly it is an object to provide an inductive torque sensor which is robust to disturbances from magnetic and electromagnetic fields, and from an electric motor control in particular.

Another particular object is to provide an inductive torque sensor which is easy and cheap to fabricate.

Still another object is to provide an inductive torque sensor which can be customized and which allows for a high design freedom.

More particularly it is an object to provide an inductive torque sensor which is wear resistant and has a long life time. ctive torque sensor as initially referred to is provided which has the characterizing features of claim 1.

Advantageous embodiments are given by the appended dependent claims and are described in the detailed description.

It will be appreciated that features of the invention are susceptible to being combined in any combination without departing from the scope of the invention as defined by the accompanying claims.

BRIEF DESCRIPTION OF THE DRAWINGS

The invention will in the following be further described, in a non-limiting manner, and with reference to the accompanying drawings, in which.

A torsion-bar torque is a torque measured using a sensor that is sensitive to a twist of a specific torsion bar that is mounted somewhere in the steering column.

An excitation coil is a, typically, circular coil of one or several loops that induces an electromagnetic field, that for the application described here, excites Eddy currents in surrounding conductive materials.

Eddy currents (also called Foucault's currents) are loops of electrical current induced within conductors by a changing magnetic field in the conductor according to Faraday's law of induction. Eddy currents flow in closed loops within conductors, in planes perpendicular to the magnetic field. They can be induced within nearby stationary conductors by a time-varying magnetic field. By Lenz's law, an Eddy current creates a magnetic field that opposes the change in the magnetic field that created it, and thus Eddy currents react back on the source of the magnetic field.

An oscillator circuit is a circuit that changes the current in the excitation coil.

A stator is a stationary structure holding one or several receiving structures.

A receiving structure is a coil structure on the stator.

A rotor is a conductive rotation member with a shape such that matches the receiving structure in such a way that a rotor rotation is detectable in the current of the receiving structure.

Over-hearing means the problem of induced current in the other receiving structure compared to the one that should pick up the field of the corresponding rotor.

o-controller unit, a small computer on a single metal-oxide-semiconductor integrated circuit (IC) chip.

An ECU is an electric control unit that is used to read analogue sensor signals and digital signals, that can come over e.g. a signal bus, perform any type of computations, such as e.g. perform a control task and actuate actuators, either via a sent analogue or digital signal or by directly controlling e.g. an electric motor from a motor control stage.

Orthogonal functions have the definition that the functions f and g are orthogonal if the scalar product of them is zero. Below is an example of an orthogonal pair in a polar coordinate system with the rotational angle, φ.

$$\int_{\tau} f(\varphi)g(\varphi)d\varphi = 0$$

where τ denotes the interval of one revolution, 2π.

A Fourier series is a set of orthogonal functions.

$$\int_{\tau} \sin M\varphi \cos N\varphi d\varphi = 0$$

$$\int_{\tau} \sin M\varphi \sin N\varphi d\varphi = 0,\ M \neq N$$

$$\int_{\tau} \cos M\varphi \cos N\varphi d\varphi = 0,\ M \neq N$$

where τ denotes the interval of one revolution, 2π. That means that functions from a Fourier series are always orthogonal if M≠N.

A steering-wheel torque measurement is a torque measured in the steering column or in the steering wheel.

DETAILED DESCRIPTION

Figure 1:
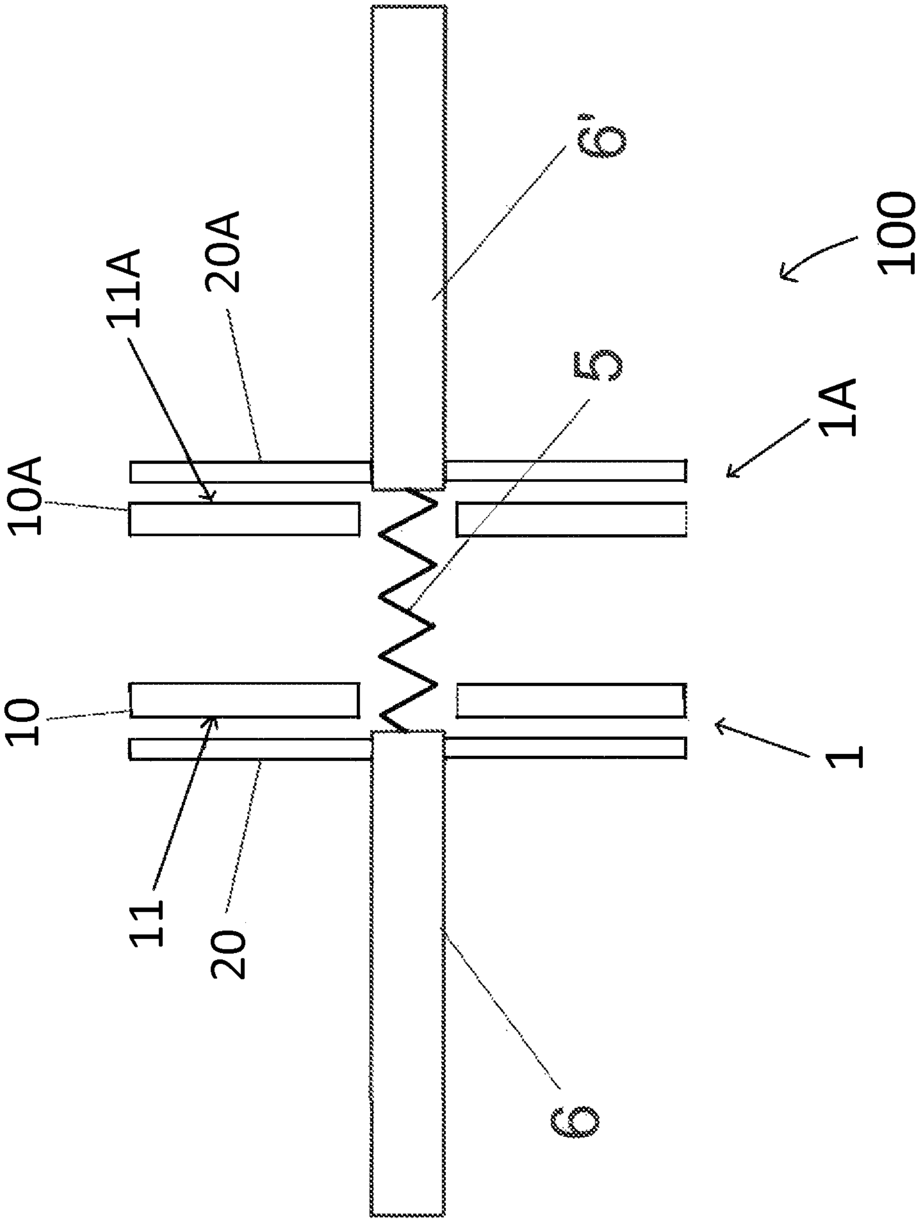
FIG. 1. schematically illustrates an inductive torque sensor according to one embodiment of the present invention, FIG. 2. is a schematic top view of a first stator arrangement with a receiving structure of the inductive torque sensor shown in FIG. 1, FIG. 3. is a schematic top view of a first rotor of the inductive torque sensor shown in FIG. 1, FIG. 4. is a schematic view of a sensor element comprising a receiving structure and a rotor of the inductive torque sensor shown in FIG. 1, and FIG. 5. is a schematic view of a portion of a stator board with a sensor chip of the inductive torque sensor shown in FIG. 1, For the purposes of describing the present invention, and to facilitate the understanding thereof, the following definitions are given, some of which will be relied upon in the detailed description of advantageous embodiments.

FIG. 1 is a schematic view of an inductive torque sensor 100 according to a first embodiment of the present invention.

The sensor principle as referred to earlier in the application is based on a combination of two inductive position sensors 1,1A, arranged to measure an angle at each end of obtaining the torsion bar torque as the angle difference times the stiffness of the torsion bar 5. The inductive torque sensor 100 comprises at least one excitation coil or transmitter coil 40 (cf. FIG. 2), at least one oscillator circuit (not shown) which is connected to the excitation coil and which generates a periodic alternating voltage and couples it into the excitation coil during operation, at least two stator arrangements 10,10A, each comprising a number of periodically repeated receiving structures 11,11A (see FIG. 2), two rotors 20,20A which can be rotated relative to the stator arrangements 10,10A and which influence the strength of the respective inductive coupling between the excitation coil and the receiving structures 11,11A and an evaluation means, e.g. an MCU (not shown) suitable for the evaluation of the signals induced in the receiving structures 11,11A.

The inductive torque sensor 100 is in the embodiment shown in FIG. 1 arranged to measure the torque in an axle comprising a first, e.g. upper, axle section 6 and a second, e.g. lower, axle section 6', (e.g. the steering torque of a steering column comprising a first steering column portion and a second column portion) between which sections a torsion bar 5 is arranged. The inductive torque sensor 100, as also referred to above, comprises a first stator arrangement 10 and a second stator arrangement 10A, a first rotatable rotor 20 and a second rotatable rotor 20A. The first and second rotors 20,20A are each connected to the axle, the first rotor 20 being connected to the upper axle section 6 and the second rotor being connected to the second, here lower, axle section 6'. The first rotor 20 is arranged at one end of the torsion bar 5 and the second rotor 20A is arranged at a second end, opposed to said first end of the torsion bar 5 and the stator arrangements 10, 10A are arranged between the two rotor 20,20A, each stator arrangement 10,10A comprising a respective receiving structure 11,11A facing a respective rotor 20,20A.

The first rotatable rotor 20 serves the purpose of, by rotation, influencing the strength of the inductive coupling between the/an excitation coil and the receiving structure 11 of the first stator arrangement 10 and the second rotatable rotor 20A, serves the purpose of, by rotation, influencing the strength of the inductive coupling between the/an excitation coil and the second receiving structure 11A of the second stator arrangement 10A; the excitation coil, by induction, giving rise to Eddy currents in the in the first rotor 20, and the first receiving structure 11 will have induced the Eddy currents produced in the first rotor 10, and correspondingly for the second rotor 20A and the second receiving structure 11A.

Figure 2:
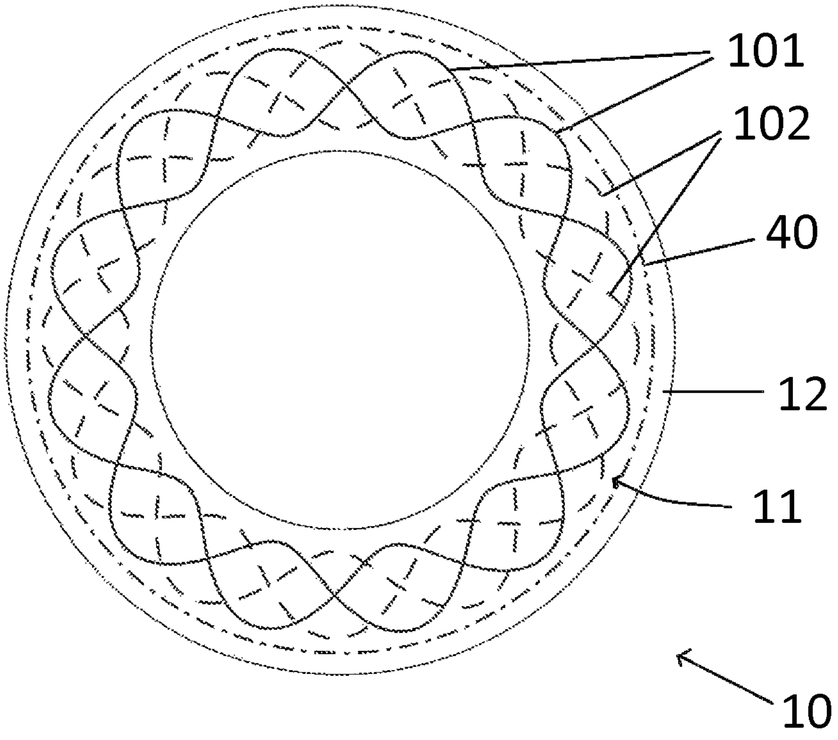

The shape of the rotor 20,20A will be further described with reference to FIG. 3 below and comprises rotor structure periods matching the periods of receiving structures 11,11A of the stator arrangements 10,10A. Preferably the number of periods of the first receiving structure 11 of the first stator arrangement 10 and of the first rotor 20 is the same and the number of periods of the second receiving structure 11A of the second stator arrangement 10A and of the second rotor 20A is the same, but the period and number of rotor elements of the first rotor 20 and stator arrangement 10 structure (combination) shall not be the same as the period and number of rotor elements of the second rotor 20A and stator arrangement 10A structure (combination). In alternative embodiments the number of periods of the first receiving structure 11 of the first stator arrangement 10 and of the first rotor 20 is not the same and the number of periods of the second receiving structure 11A of the second stator arrangement 10A and of the second rotor 20A is not the same, FIG. 2 schematically illustrates a first stator arrangement 10 according to one embodiment of the present invention. The first receiving structure 11 comprises a first coil structure 101,101 and a second coil structure 102,102. The coil structures 101,101,102,102 are here located on a circuit or stator board 12, and each coil structure 101,102 has a sinusoidal shapes. The first coil structure 101 comprises two cosine coils forming a cosine loop (solid lines) and the second coil structure 102 comprises two sine coils, forming a sine loop (dashed lines). The first coil structure, the cosine loop, 101 and the second coil structure, the sine loop, 102 are connected such that a full revolution of the first cosine coil is connected (not shown in FIG. 2) in series with the other cosine coil. The different shapes are arranged in different layers on the circuit board. These serial connected cosine coils form the cosine part of the first receiving structure 10. The sine part of the first receiving structure 10 is made similarly. The excitation coil 40 can have one or several loops. Ideally, such a circular loop induces a homogeneous field through the plane of the circuit board 12.

The second stator arrangement 10A is similar to the first stator arrangement 10, but, as referred to above, the number of periods of the first stator/rotor and of the second stator/rotor structures different, and hence also the number of rotor elements of the first and second rotors 20,20A are different.

In a first embodiment each stator arrangement comprises a circuit board 12, in an alternative embodiment (not shown) there is a common circuit board for the first and second receiving structures which then are arranged in different layers of the circuit board allowing savings of costs, and in addition, then a single excitation coil is enough for both angle sensing parts of the inductive torque sensor.

Figure 3:
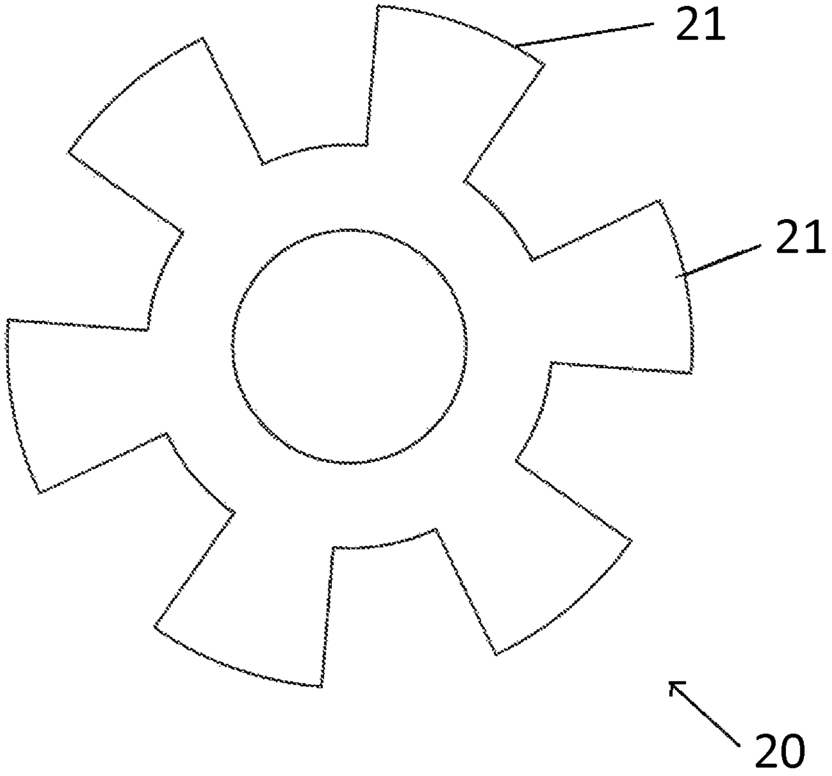

FIG. 3 schematically illustrates a first rotor 20 with a number of rotor elements 21 arranged to, in rotation, form a square wave in a polar coordinate system as will be further explained below.

Figure 4:
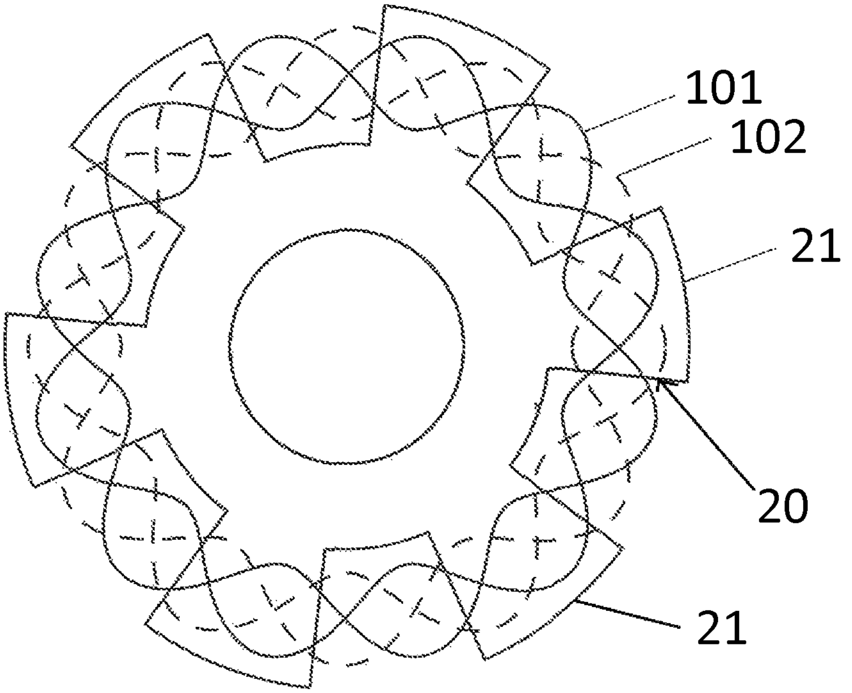

FIG. 4 schematically illustrates a first sensor part 1 of the inductive torque sensor 100 comprising the first receiving structure 11 of the first stator arrangement 10 and the first rotor 20, the first rotor 20 and stator arrangement 10 structure. The solution according to the present invention is based on orthogonal Fourier series, and the first rotor 20 and stator arrangement 10 structure and the second rotor 20A and stator arrangement 10A structure are orthogonal, and the first rotor 20 and stator arrangement 10 structure forms one function in an orthogonal system and the second rotor 20A and stator arrangement 10A structure forms another function in the same orthogonal system, which is the definition of orthogonality, and the first rotor 20 and stator arrangement 10 structure will not see the second rotor 20A and stator arrangement 10A structure and vice versa. Therefore, when the two structures are made orthogonal in this way, there is no risk that one receiving structure will pick up the field of the other rotor and vice versa.

As the stator arrangements and the rotors of the individual sensors 1,1A of the inductive torque sensor 100 are located on the same axle, the excitation coil (not shown in the figures) will excite the first rotor 20 that in turn excites the first receiving coil structure 11. If the rotor 20 is just above one of the cosine "eyes" of the first, cosine, first coil structure 101, the cosine loop, the cosine current will have its greatest magnitude. As the second coil structure 102, the sine loop, is 90 degrees after, it will in this position have zero magnitude. Therefore, the first receiving structure 11 will receive a sine and a cosine current that is reflecting the position of the rotor 20. nd stator arrangement 10 structure will produce a pure sinusoidal signal with M full periods for a full revolution and the second rotor 20A and stator arrangement 10A structure will produce a pure sinusoidal signal with N full periods for a full revolution, or vice versa. M and N are therefore integers.

Furthermore, to achieve an angle of one of the rotor and stator arrangement structures 11,20;11A,20A, there should be two sinusoidal receiving structures for each, with a phase difference of π/2, i.e. one sine and one cosine. Then, the signals produced will be:

$$x=\cos(M\varphi)$$
$$y=\sin(M\varphi)$$

and, hence, the angle can be calculated as:

$$M\varphi=\arctan(y/x)$$

where the result of the arctan function is unwrapped such that the angle will be continuous. Note that y/x is singular when x is zero. As well known for a person skilled in the art, arctan(x/y) is used, and the correct angle can be calculated from this new angle, as well known, when beneficial.

With two, or more, such rotor 20,20A and stator arrangement 10,10A structures producing pure sinusoidal signals with M or N periods for a full revolution, for the two, or more, rotor and stator arrangement structures respectively, the resulting signals will belong to the orthogonal system of a Fourier series if M≠N. This is sufficient for the receiving structure 11,11A of one rotor and stator arrangement structure not over-hearing or receiving signals from the rotor of the other rotor and stator arrangement structure; thus $$\frac{\max(M,N)}{\min(M,N)}\neq\text{integer}$$

In an alternative embodiment, each receiving structure is made of one or more, saw toothed shapes. As such a shape will result in a saw toothed current, it is possible to detect the position of the rotor. f the inductive torsion bar torque sensor according to the inventive concept that the relation for Fourier series $$M\neq N$$

does not impose many restrictions on the design of a torsion-bar torque sensor. The integers M and N can both be close to the desired integer, defined by typical design aspects such as e.g. resolution, noise etc.

For example, if an optimal integer for the design of a sensor is X, then X and X+1 (as M and N respectively) or X and X−1 can be used, which are still both close to the optimal integer X; e.g. in one embodiment the optimal integer is 8, then M=7, N=8 or M=8 and N=9 can be used, or vice versa.

More generally the numbers of periods (M,N) of the first and second receiving structures 10;10A and the number of periods of the second receiving structures at least are larger than 3, preferably larger than 4, most particularly larger than 5.

In advantageous embodiments the number of periods of the first receiving structures 10 M=N+/−S, N being the number of periods of the second receiving structure 10A, or vice versa, N=M+/−S, wherein S is between 1 and 3. More particularly S≤2, most particularly S=1.

To be able to use close numbers has shown to be very advantageous for several reasons.

First, the order number, M and N, should be designed so that the sensor gives enough resolution at the same time as it has a low noise as well as a high robustness. The greater the order number, the more noise and higher effects of non-linearities that are always present (such as due to imperfect rotors, imperfect receiving and excitation coils or the shape of the field generated by the excitation coils or the housing's conductivity). Therefore, any design will have an optimal order number, and it has been realized that it is extremely advantageous to have order numbers which are both close to that optimal value.

Second, even if the ideal Fourier series are orthogonal, there are always imperfections. These imperfections can be seen as over-tones in the Fourier series, and by the definition of orthogonality of Fourier series, the over-tones might not be orthogonal. For example, as is the case with the shown in WO2009/095442, the first over-tone of an order 8 will have order 16, which will not be orthogonal to the order 16, and hence be subjected to over-hearing.

In the case of relation according to the present invention, e.g. with M=8 and N=9, there is a risk of over-hearing first for the first common over-tone, which then would be the $9^{th}$ over-tone of order 8 (72) and the $8^{th}$ over-tone of order 9 (also 72), which are reasonably high over-tones, and the higher the over-tone, the less energy, and hence, the risk of over-hearing of over-tones will be very low.

It has been realized that, for achieving a good resolution of the position sensors 1,1A, each of the structures, N, M as defined above should have a high order number, but, in order to avoid a high noise and a limited accuracy, the order number should also not be too high.

Preferably the first common over-tones are high, or as high as possible also considering the above and as also discussed below.

Preferably N, M are above or equal to 4, particularly between 4 and 10; even more particularly between 5 and 10. The resolution of a D/A-converter will be about one period, and thus the resolution will be proportional against 1/N and 1/M respectively.

Most particularly the relation, or quotient between the maximum number and minimum number of repeated shapes of the shapes of the first and second pair of coil structures and rotors is a non-integer between 1 and 3, and N and M are close The invention with orthogonality by choosing M≠N, with the avoidance of over-hearing, give the possibility to have not only one single excitation coil and one oscillator circuit for the excitation of both rotors, but also one single board for the receiving structures. The receiving structures then cannot, simply speaking, see the wrong rotor. As an example. The order 9 receiving structure cannot see the order 8 rotor and vice versa.

Using one single board and one single excitation coil oscillator circuit is beneficial from a cost point of view and also from a packaging point of view, as there is only one circuit board and no need to separate the rotors apart to avoid over-hearing. however, that the invention is not limited to the use of but one excitation coil oscillator circuit; two or more may also be used in alternative embodiments. Neither is the invention limited to the use of a single board.

It is possible to choose arbitrary shapes of the repeated structures of both the rotors and the receiving structures. The only requirement is that the shapes of the signals generated by the combination of rotor shape and receiving structure shape for the respective receiving structure and rotor pair are orthogonal. Any signal shape is valid, from an orthogonality perspective, where the Fourier terms of the two different signals does not contain the same order numbers. As an example, one signal can have the Fourier series [8 16 24 32 48 56 64] and the other the Fourier series [9 18 27 36 45 54 63]. By the definition of orthogonality, these two angle signals are orthogonal, and cannot see each other. Therefore, again, all the benefits mentioned above can be achieved. Another benefit by choosing higher order shapes as in this embodiment is that the resolution of a sinusoidal signal is best close to zero, and very poor close to the maximum amplitude (as at the maximum amplitude, there is no change in the signal for an angle change). As two signals are used, cf. the embodiment with sine and cosine shape, one can be chosen to have the greatest possible slope when it is dominant for the resolution (cf. arctan(y/x), where when x moves slowly, y is dominant for the resolution and vice versa). In this embodiment, the function arctan will be replaced by another function for achieving the transfer function between the quotient between x and y and the angle (and as mentioned for the case of arctan also the transfer function between quotient between y and x and the angle is needed). Such functions are always, at least numerically, possible to calculate as all Fourier terms in the equation are known. By changing the shape from single sinusoidal Fourier term shape to a more complex one, the resolution or noise can be improved by close to 50 percent.

If the rotor structure in the aforementioned embodiment is a square wave in a polar coordinate system, just as before, the signals generated corresponds to the shape of the Fourier terms in the receiving structures.

Figure 5:
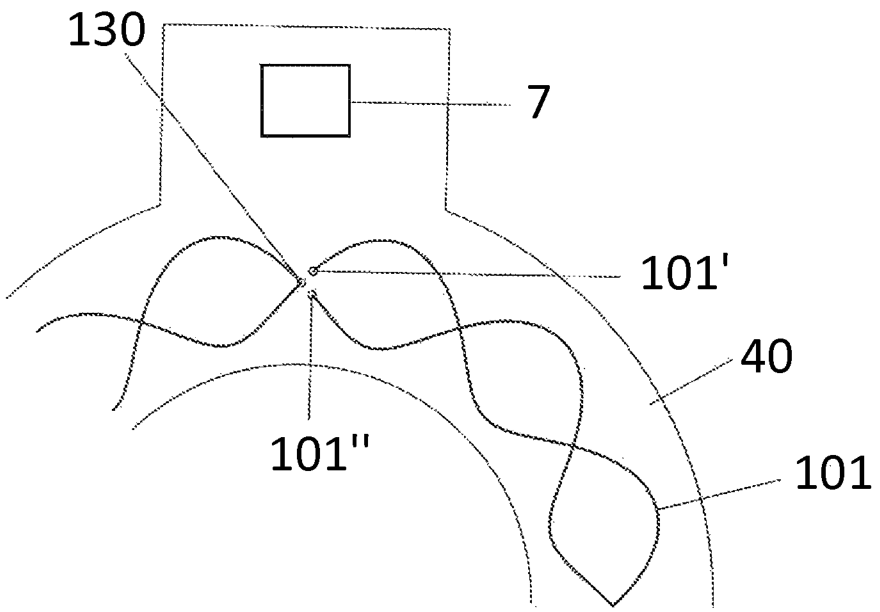

FIG. 5 is a schematic view of a portion of the first stator arrangement 10 showing a portion of the circuit board 12 and for illustrating connection to a sensor chip 7 (MCU). Only the cosine loop of) is illustrated for reasons of simplicity, the functioning and arrangement being similar for the sine loop structure. The cosine coil, having one positive and one negative cosine shape, are connected at 130. The cosine coil structure has ends 101',101" which are connected to the sensor chip 7. The ends of the excitation coil 40 are connected in a similar manner (not shown).

According to the present invention, and as should be clear from the above, the orthogonality between the signals generated in the two different angle sensors is crucial for achieving the benefits of substantially no, or only a very low, risk of overhearing between the two angle sensors, a considerably improved design freedom allowing making both angle sensors optimal or very close to optimal with regards to resolution and noise suppression, e.g. through selection of optimal order numbers of N and M.

Particular cost benefits can be achieved by the use of only one excitation coil and circuit, and/or one receiving structure circuit board.

In addition particular packaging benefits can be achieved by both using one circuit board, and closer distance to the rotors, and hence between the rotors.

By choosing a general orthogonal function, it is possible to improve the resolution and/or noise levels, and make the resolution more even for all angles.

It is also an advantage of the present invention that, as also referred to above, a very high degree of design freedom is allowed, and the torque sensor is easy to fabricate, among other things for advantageously having a comparatively low number of rotor elements, and since in advantageous embodiments a close or substantially similar a numbers of rotor elements with advantage are used for the first and second rotor.

Several benefits are noted from the embodiments of the invention, and one specific benefit, namely the optimisation of resolution and noise reduction, will impose that the order numbers, M and N of the repeated structures are similar. Namely that the quotient between the maximum number and minimum number of repeated shapes of the first and second pair of coil structures 11,11A and non-integer close to 1. To be reasonably close to optimum, this number should preferably be between 1 and 3, or at least between 1 and 5.

An inductive torque sensor as described above connected to an ECU can e.g. be used for a power assisted steering system for a vehicle or similar, comprising a steering shaft or axle connected to the steering arrangement for measuring the torque in the steering shaft, or axle.

Of course it may also be used in many other applications wherever the requirements as to a high accuracy, robustness to disturbances and over-hearing and a long life length are high.

It should be clear that the invention is not limited to the specifically illustrated embodiments, but that it can be varied in a number of ways within the scope of the appended claims.

The invention claimed is:

1. An inductive torsion bar torque sensor, e.g. for a power assisted steering system, comprising at least a first and a second stator arrangement that each have a receiving structure comprising a periodically repeated shape or structure having a first and a second period respectively and a first and a second rotor rotatably arranged with respect to the first and second stator arrangements forming two inductive position sensors arranged to measure an angle at each end of a torsion bar and generate respective signals, where the difference between measured angle values of the two inductive positions sensors times a stiffness of the torsion bar is the torsion bar torque, the inductive torsion bar torque sensor further comprising at least one excitation coil and at least one oscillator circuit for generating a periodic alternating voltage and coupling it into the at least one excitation coil during operation, wherein the periodicity of the first receiving structure is different from the periodicity of the second receiving structure, and the first and second receiving structures each comprises a respective first coil structure and a respective second coil structure each having a repeated shape, the first rotatable rotor serving the purpose of, by its position, influencing the strength of an inductive coupling between one of the at least one excitation coil and the receiving structure of the first stator arrangement, and the second rotatable rotor serving the purpose of, by its position, influencing the strength of an inductive coupling between the one of the at least one excitation coil or another one of the at least one excitation coil and the second receiving structure of the second stator arrangement, wherein the respective signals generated by the first and second of receiving structures and rotors as a result of the periodic alternating voltage are orthogonal.

2. The inductive torque sensor according to claim 1, wherein the signals generated by receiving structures and rotors of the respective induction positions sensors each has a shape of a respective repeated Fourier series and in that terms of the Fourier series of the signal generated by one receiving structure and rotor do not comprise terms of the Fourier series of the signal generated by the other receiving structure and rotor pair.

3. The inductive torque sensor according to claim 1, wherein the relation, or quotient, between the maximum number and minimum number of repeated shapes of the first and second of receiving structures and rotors is a non-integer.

4. The inductive torque sensor according to claim 1, wherein the relation, or quotient, between the maximum number and minimum number of repeated shapes of the first and second of receiving structures and rotors is a non-integer between 1 and 5.

5. The inductive torque sensor according to claim 1, wherein the first stator arrangement and the second stator arrangement each comprises a circuit or stator board on which a respective one of the respective receiving structures is arranged, and in that each stator arrangement comprises a respective excitation coil.

6. The inductive torque sensor according to claim 1, wherein the receiving structures of the first stator arrangement and the second stator arrangement are arranged on a common circuit or stator board and in that a common excitation coil is used for exciting the first and second receiving structures.

7. The inductive torque sensor according to claim 1, wherein each rotor comprises a number of rotor elements, or rotor structure periods, being the same as the number of periods of the respective receiving structure of the respective, corresponding, stator arrangement.

8. The torque sensor according to claim 1, wherein each rotor comprises a number of rotor elements, or rotor structure periods, matching the number of periods of the respective receiving structure of the respective, corresponding, stator arrangement such that the first rotor and stator arrangement structure forms one function in an orthogonal system and the second rotor and stator arrangement structure forms another function in the same orthogonal system.

9. The inductive torque sensor according to claim 1, wherein the first and second receiving structures have sinusoidal shapes.

10. The inductive torque sensor according to claim 9, wherein each respective first coil structure comprises a cosine loop with two, a first and a second, cosine coils connected such that a full revolution of the first cosine coil is connected in series with the second cosine coil, that each second coil structure comprises two sine coils, a first and a second, sine coils connected such that a full revolution of the first sine coil is connected in series with the second sine coil.

11. The inductive torque sensor according to claim 1, wherein each receiving structure comprises a respective first coil structure and a respective second coil structure each having a saw-toothed shape.

12. The inductive torque sensor according to claim 1, wherein each rotor comprises a number of rotor elements arranged to, in rotation, form a square wave in a polar coordinate system.

13. The inductive torque sensor according to claim 1, wherein the number of periods of the first and second receiving structures are selected such that the first common over-tones are of a high order to have low risk of over-hearing of over- tones.

14. The inductive torque sensor according to claim 1, wherein the number of periods of the first and second receiving structures are selected such that at least the first over-tones are orthogonal.

15. The inductive torque sensor according to claim 1, wherein the numbers of periods of the first and second receiving structures and the number of periods of the second receiving structures at least are larger than 3.

16. The inductive torque sensor according to claim 1, wherein the number of periods of the first receiving structures M=N+/−S, N being the number of periods of the second receiving structure, or vice versa, wherein S is between 1 and 3.

17. The inductive torque sensor according to claim 1, wherein M=N+/−2, or particularly M=N+/−1, i.e. S=2, or, more particularly, S=I.

18. The inductive torque sensor according to 17, wherein the period, M, of the first receiving structure is between 3 and 15.

19. The inductive torque sensor according to claim 1, wherein the evaluation means comprising a sensor chip comprising an MCU for evaluation of the signals induced in a said receiving structure, and in that ends of the first and second coil structures of a receiving structure and ends of a said excitation coil are connected to said sensor chip.

20. Use of an inductive torque sensor according to claim 1, for sensing steering torque for calculation of steering assistance in a power assisted steering system of a vehicle, e.g. a car, a bus, a truck, an aircraft, a boat or a remotely operable vehicle or for sensing torque in a shaft in a machine.

* * * * *